Jan. 9, 1923.

L. A. JONES.
ILLUMINATION FOR PLANE SURFACES.
FILED NOV. 18, 1920.

WITNESSES:

INVENTOR
Lloyd A. Jones,
BY
ATTORNEYS.

Jan. 9, 1923.
L. A. JONES.
ILLUMINATION FOR PLANE SURFACES.
FILED NOV. 18, 1920.
1,441,689.
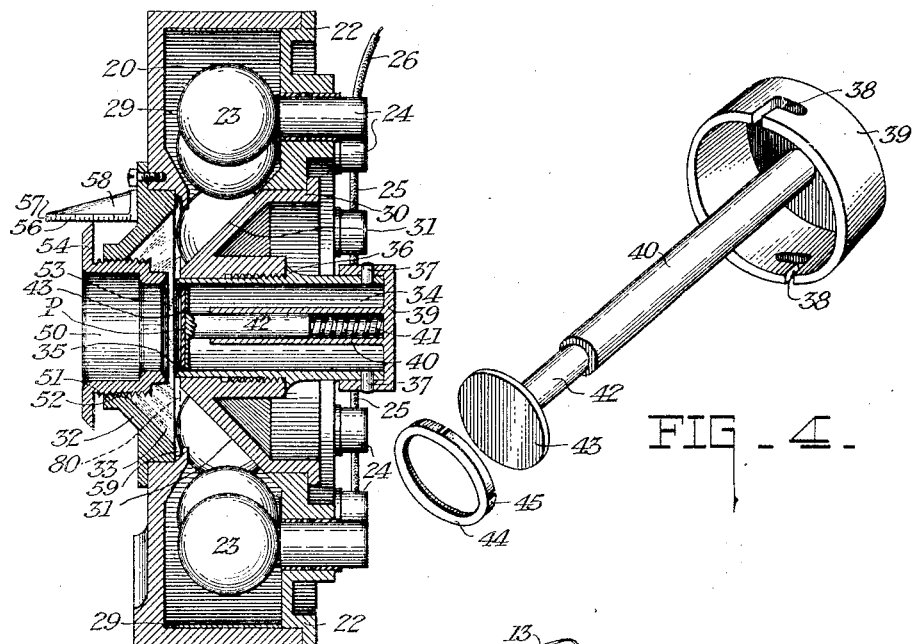
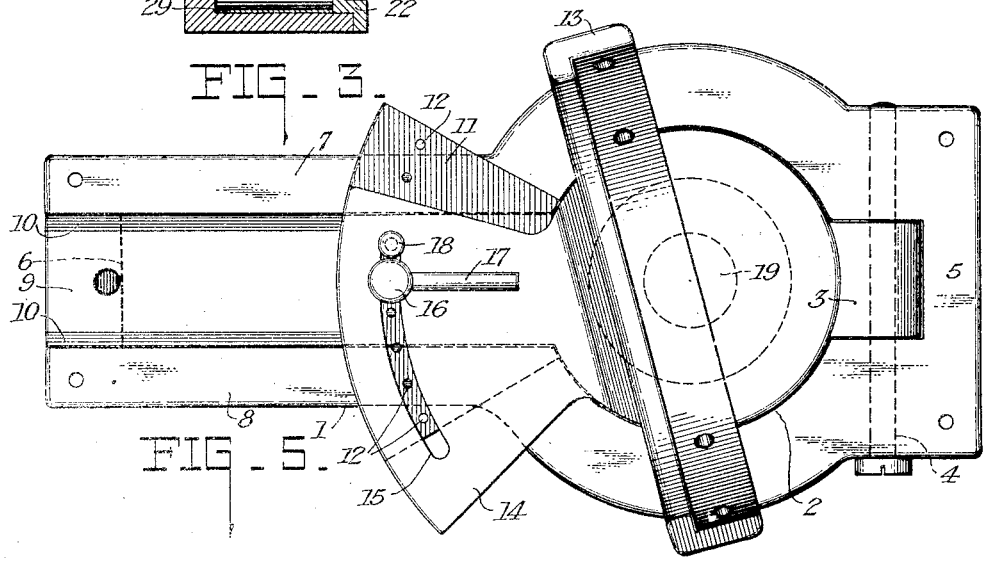
INVENTOR
Loyd A. Jones,
BY R. L. Stinchfield
Donald H. Stewart
ATTORNEYS.

Jan. 9, 1923.

L. A. JONES.
ILLUMINATION FOR PLANE SURFACES.
FILED NOV. 18, 1920.

WITNESSES:

INVENTOR
Loyd A. Jones,
BY
ATTORNEYS.

Patented Jan. 9, 1923.

1,441,689

UNITED STATES PATENT OFFICE.

LOYD A. JONES, OF ROCHESTER, NEW YORK, ASSIGNOR TO EASTMAN KODAK COMPANY, OF ROCHESTER, NEW YORK, A CORPORATION OF NEW YORK.

ILLUMINATION FOR PLANE SURFACES.

Application filed November 18, 1920. Serial No. 424,985.

*To all whom it may concern:*

Be it known that I, LOYD A. JONES, a citizen of the United States of America, residing at Rochester, in the county of Monroe and State of New York, have invented certain new and useful Improvements in Illumination for Plane Surfaces, of which the following is a full, clear, and exact specification.

This invention relates to illuminators, and more particularly to devices of this nature which are adapted for use when testing or comparing the surfaces of various materials, such as paper, cloth, metal, etc. One object of my invention is to provide a machine which will evenly illuminate a sample or test piece of material with a standard light source, and eliminate other light therefrom; another object is to provide a device of the character described in which light will fall upon the sample with grazing incidence, the angle of which is under the control of the operator; still another object is to provide an accurate means for determining the degree of such grazing incidence; a further object is to provide a device which will hold and illuminate a sample in position for viewing through a microscope, or for photographing; and a still further object is to provide a specimen holder with which stereo pictures can be made without altering the position of the camera. To these and other ends the invention resides in certain improvements and combinations of parts all as will be hereinafter more fully described, the novel features being pointed out in the claims at the end of the specification.

Heretofore it has been difficult, if not imposible, to determine slight differences and variations between the surfaces and textures of various materials. For instance, the difference in the degree of polish applied to metals may be considerable, and yet measurements of such differences are difficult to obtain. So also in cloths, in fabrics of various kinds and in silks, the surfaces may differ far more than would be evident from a visual or even an ordinary microscopic examination. One of the hardest mediums to test by any of the usual methods is paper, for the varieties of surface and texture are almost infinite Microscopic examination alone is not sufficient because slight differences in the illumination or in the grazing incidence of the light upon the paper will alter the appearance of the fibers and thus the surface of the paper.

My device is particularly adapted for use in determining relative comparisons, and making accurate measurements of the surfaces of papers, and I will, therefore, describe it as so used.

I have found that by furnishing a standard light source, a fixed sample holder, and by controlling the entire illumination of the sample, accurate measurements and records of various surfaces can be obtained, either by direct visual examination or by photography. By calibrating my device, the same lighting can be duplicated at will, and, where the angle of incident of illumination is the same, accurate comparisons can be obtained. By photographing the sample according to my process, stereoscopic negatives can be made so that the grain and fiber of the sample will stand out with realistic relief. The sample is preferably magnified either for viewing or photographing, although this is not essential.

In the drawings, in which like reference characters denote like parts:

Fig. 3 is a section on line 3—3 of Fig. 2, the base and support being removed;

Fig. 4 is an enlarged perspective of the sample holder removed from the illuminator;

Fig. 5 is a plan view of the base and support with the illuminator moved; and

Figure 1:
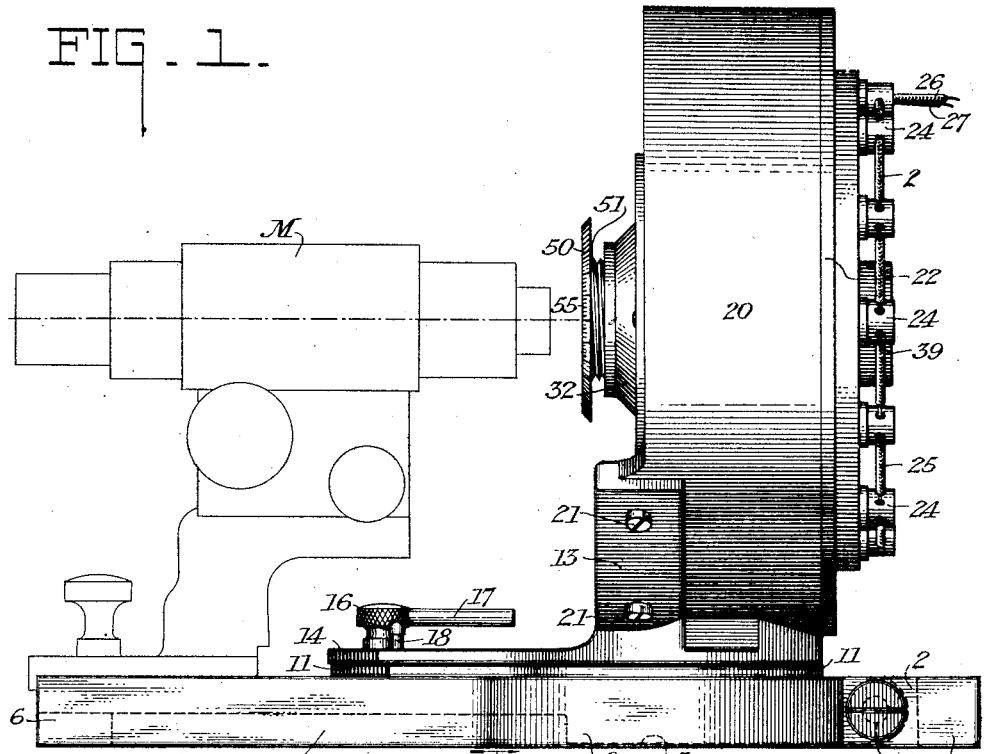
Fig. 1 is a side elevation of an illuminator constructed in accordance with and illustrating one embodiment of my invention.
Figure 2:
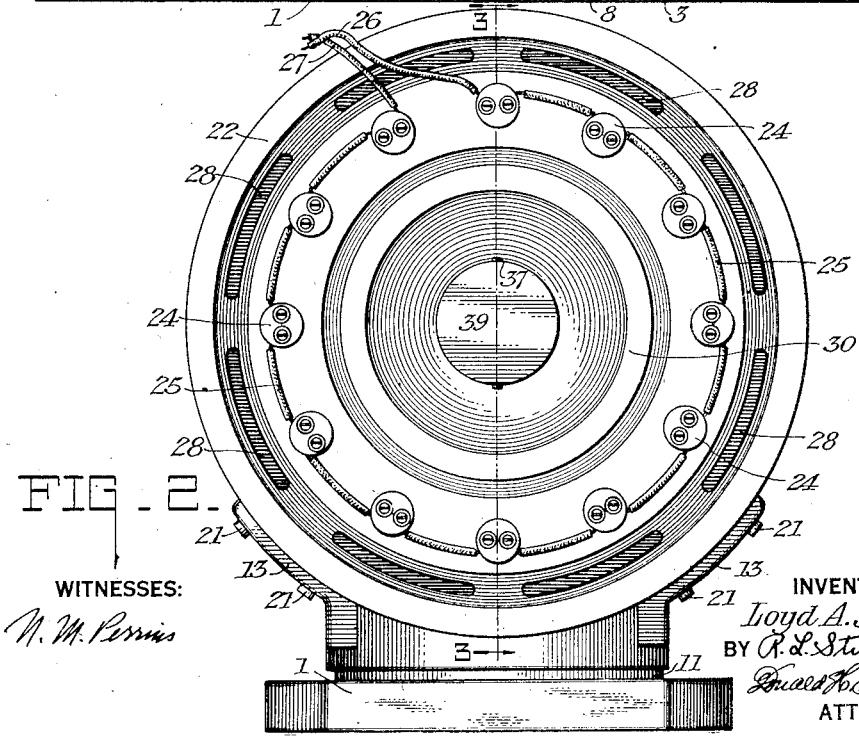
Fig. 2 is a rear elevation of the machine shown in Fig. 1.

A base, designated generally by 1, is preferably constructed of metal, having an opening 2 in the center in which a movable leaf 3 is hinged by a bolt 4. Ends 5 and 6 join the sides 7 and 8 of the base. One end, 9, of the leaf 3 is beveled inwardly at 10 to provide a seat for a microscope, shown in fine lines in Fig. 1, or for a camera. Upon leaf 3 there is affixed a segment 11 containing a number of apertures 12, accurately spaced to each side of the center line of the base 1. Pivotally mounted upon leaf 3 is a yoke 13, having integral therewith a segment 14 corresponding in shape to segment 11, and having an arcuate slot 15 above the apertures 12. A lock nut 16 operated by a handle 17 is provided for fastening the yoke at the desired position, and one or more pins 18 may be used to limit the rotative movement of the yoke in each direction, about its pivot 19.

The lamp casing 20 is supported in the yoke by screws 21. The back 22 of the lamp house is removable, and contains a crown of twelve lamps, 23, in the form illustrated in Fig. 3. The bases 24 of these lamps are connected in series by wires 25, wires 26 and 27 going to the source of power. Air slots 28 are cut through the back 23 at intervals so as to prevent overheating. A band of polished nickel 29 lines the periphery of the lamp house to reflect the light, although any suitable reflecting surface may be used. The central portion of the back is cut away providing a seat for a member 30, which has a highly reflecting frusto-conical surface 31, this part reflecting the light to a second annular member 32 having also a highly polished mirror like hollow frusto-conical surface 33 opposite surface 31. By means of the above described reflectors the light from lamps 23 is directed toward the axis of the annular members, providing a strong even illumination. It should be noted here that the normal direction of the majority of the light rays reflected by mirrors 31 and 33 is substantially parallel to the surface of the test sample P. This brings into relief minute protuberances or irregularities of the surface of the paper.

Screwing into member 30, there is a tubular member 34 having a lip 35 formed inwardly from one end, and a shoulder 36 locating definitely the position of this holder. It should be noted that in Fig. 3 the dimensions of lips 35, and ring 44 (later described) are greatly exaggerated, being impossible to draw to the proper scale. These parts are made of very thin metal (approximately .005" thick) so that practically no light is cut off by the metal rings. Pins 37 extending outwardly provide, with slots 38 of cap 39, a bayonet lock by which the cap is held in place. A tube 40 extending from cap 39 contains a spring 41 which tends to thrust outwardly upon a plunger 42 supporting a sample holder 43. The sample holder consists of a disk having a ring 44, with a split spring collar 45, adapted to fit closely around the disk, and confine a sample paper blank P thereon. These blanks can be punched from sample stock with suitable apparatus. The sample thus held in place is thrust into the tube 34, the lip 35 limiting the inward movement of the holder, and the spring 41 tending to thrust out upon the cap 39 thereby holding the sample in the desired plane, while at the same time the bayonet lock is also held firmly. The surface of the paper sample fixed in relation to the reflectors and lamps by this mechanism, and the sample holder can be rapidly and easily loaded.

In order to control the angle of incidence of the illumination across the test sample, a light regulating ring 50 is provided with a threaded portion 51 cooperating with the tapped aperture 52 of the annular member 32, so that it may be turned, moving to and from the paper. The beveled edge 53 acts as a shield to cut off or allow more or less illumination, the distance of this part from the paper or sample holder controlling the incident angle of illumination. This ring is preferably blackened inside to eliminate the reflection of outside light rays as completely as possible. An outwardly flared flange 54, bearing a scale 55, provides a means for turning the ring 50 and also for measuring the illumination. A second scale 56 may be provided if desired on the edge 57 of part 58, to facilitate reading; the number of revolutions and fractions thereof of ring 50 determining the light admitted to the sample and the grazing incidence thereof. If necessary a sheet of diffusing material 80 such as ground glass, opal glass or the like, may be inserted between reflectors 31 and 33 in the grooves 59 provided for that purpose.

Figure 6:
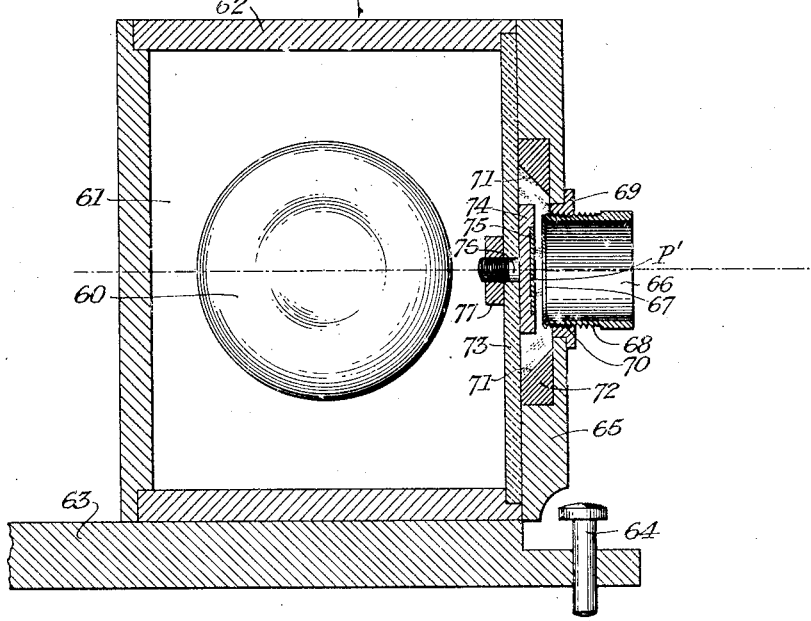
Fig. 6 is a section through another embodiment of my invention.

In Fig. 6 I show another embodiment of my invention, wherein a lamp 60 is enclosed in a housing 61, the walls of which preferably reflect light rays. The top 62 is removable, and the housing is mounted upon a base 63 adapted to swing about pivot 64. The front 65 supports in a mount 69, a revoluble ring 66 having an inner beveled edge 67 and a threaded portion 68 cooperating with the thread 70 of mount 69. A reflector 71 comprising a highly polished nickel ring 72 is sunk in the front 65, and will reflect light passing through the diffusing screen 73 evenly across the face of a sample P' being tested. This sample is held in a block 74, which has a reduced central portion 75 into which the sample fits. A shank 76 passing through screen 73 holds the block 74 in place by means of a nut 77. As in the first described embodiment of grazing incidence of the light is controlled by the ring 66, which may be suitably graduated.

The operation of my device is as follows:

*For visual examination.*

The machine is set up as shown in Fig. 1, with a microscope M in place. A sample blank is placed in the holder 34, which is then thrust into the illuminator and fastened in place by the bayonet lock 37–38. After focusing the microscope accurately, the adjusting ring is moved back and forth until the best relief or view of the surface is obtained. By noting the setting it is a simple matter to visually compare blank after blank with a standard sample. Very minute differences in the surfaces are apparent, when the surface is illuminated from the proper angle. By directing the sole source of illumination substantially parallel to the plane of the surface, and by gradually changing the light angle, the irregularities of surface are clearly made visible, and the most desirable view can be readily ascertained.

For making photo-micrographs.

The microscope shown in Fig. 1 is removed and a camera of suitable design is fastened to the base. The image of the test blank is then focused and photographed in the usual manner. The illumination, coming as it does from all sides of the machine, provides an even and constant light, which is directed to the sample being photographed, and, being shielded by the adjusting ring, cannot shine into the lens. With a suitable photo-micrographic equipment, photographs showing the surface on a greatly magnified scale can be obtained and measurements can be made as the scale is of known value.

For making stereo-photographs.

The camera and illuminator are set up in the manner above described. The entire illuminator is then rotated relative to the camera by releasing nut 16 and swinging it upon its pivot 19. If desired, stop pins can be placed in apertures 12 to make limiting stops equidistant from the camera axis on each side. By computing these angles from the known values of the average separation of the eyes and the assumed values of viewing distances, excellent relief can be obtained from the resulting prints. One photograph is made with the illuminator turned in a counter clock-wise direction from the axis of the camera lens, (the base Fig. 5 indicates this position) and then the other picture is made by rotating the device to the selected angle to the other side of the lens axis, thus obtaining right and left eye negatives. Stereo-photographs are very well suited for making comparison and testing paper surfaces, because the various irregularities of the different papers are thus shown, on a greatly magnified scale, in relief, making it easy to trace through the various contours and elevations of the surface of the subject being tested.

It is obvious that my illuminator is especially useful in the minute examination of the surface of any material. While I have chiefly described its use in connection with testing paper, I do not limit myself to this use, but contemplate an illuminator for use with any surface being tested which comes within the scope of the claims.

Having thus described my invention what I claim to be new and desire to secure by Letters Patent is:

1. In a device for illuminating test samples, the combination with a housing, of a light source in the housing, a sample holder carried by the housing, and means for directing the light rays with grazing incidence upon a sample held in the holder, and means for selectively controlling the angle of incidence of light rays coming from the light source and falling upon the sample.

2. In a device of the kind described, a holder adapted to hold in a fixed position a sample of material with a substantially plane surface, a source of light and means to throw light rays therefrom across the plane surface of material so held with grazing incidence.

3. In a device for illuminating test samples, the combination with a housing, of a sample holder carried by the housing, a source of light within the housing, and reflecting surfaces for directing the light rays from the light source into grazing incidence with the surface of a sample held in the holder, and means for controlling the quantity and angle of incidence of the light rays passed to the holder.

4. In an illuminator for test samples, the combination with a housing, of a crown of lamps carried by the housing, a sample holder adapted to be positioned in the housing, and a series of annular reflectors for directing the light rays across the surface of the sample with grazing incidence.

5. In an illuminator for test samples, the combination with a housing, of a crown of lamps carried by the housing, a sample holder adapted to be positioned in the housing, and a series of annular reflectors for directing the light rays across the surface of the sample with grazing incidence, and means for controlling the angle of incidence of the light rays directed by the annular reflectors upon said sample.

6. In a device of the kind described, a holder with a plane surface adapted to hold a sample of sheet material in a fixed testing position, a source of light and means surrounding said holder and adapted to deflect light rays from said source in substantially grazing incidence across the surface of a sample held in such testing position.

7. In a device of the class described, a holder adapted to hold in a predetermined plane a piece of sheet material, a source of light, a hollow frusto-conical mirror surrounding said holder and adapted to throw rays from the source across said plane, and an adjustable shield for controlling the light so thrown.

8. In a device of the class described, a holder adapted to hold in a predetermined plane a sheet of material, means surrounding said holder adapted to cast light rays thereon, a shield surrounding said holder and adapted to intercept such light rays except those substantially in the plane specified, said shield being adjustable to permit the passage of other rays at an angle to such plane.

9. In an illuminator for use in testing the surface of samples, the combination with a base, of a housing supported by the base, a light source and a sample holder in said housing, means for illuminating a sample in the holder from the light source and for causing a grazing incidence of the light upon the surface, an instrument support on the base, the housing being adjustable to present different views of the sample to the instrument, whereby steroscopic impressions may be obtained.

10. In an illuminator for use in testing the surface of samples, the combination with a base, of a housing supported by the base, a light source and a sample holder carried by said housing, means for illuminating a sample in the holder by means of the light source, an instrument mounted on the base, and means for altering the angular relation of the housing with respect to the instrument, so as to present different views of the sample to the instrument.

11. In an illuminator for use in testing paper samples, the combination with a housing, of a light source in the housing, means for holding a sheet of test paper in a fixed plane in the housing, and means for illuminating the sample from the light source, there being means associated with the casing for determining the grazing incidence of the light upon the sample.

12. In an illuminator for use in testing paper samples, the combination with a housing, of a paper holder in the housing, a light source in the housing, and means carried by the housing for altering the grazing incidence of the light upon the paper, and a scale associated with said means and the housing by which the grazing incidence of the light rays from the light source can be determined.

13. In an illuminator for test samples, the combination with a casing, of a light source in the casing, reflectors in the casing adapted to direct the light rays to a fixed plane in the casing, and a sample holder movable relative to the casing, and means included in the sample holder for compensating for the variable thicknesses of the test samples, so that the surface of a test sample will always lie in the fixed illuminated plane.

14. In an illuminator for test samples, the combination with a casing, of a source of light in the casing, means for controlling the light from said source and means for directing the rays with grazing incidence upon a plane surface, a test sample holder, a ring associated with the holder for holding a test sample flat, the casing and the sample holder having co-operating parts for holding the surface of the test sample in the fixed plane upon which the light rays are directed.

15. In an illuminator for test samples, the combination with a casing, of a source of light in a casing, reflectors for directing said light into gazing incidence with a fixed plane, and means for holding the surface of a test sample in the fixed plane.

Signed at Rochester, New York, this 10th day of November, 1920.

LOYD A. JONES.